United States Patent [19]

Sappington et al.

[11] 4,223,638
[45] Sep. 23, 1980

[54] APPARATUS FOR FEEDING POULTRY

[76] Inventors: Marr D. Sappington; John Katinsky, both of Rte. 2, Box 24, Hurlock, Md. 21643

[21] Appl. No.: 6,110

[22] Filed: Jan. 24, 1979

[51] Int. Cl.³ .............................................. A01K 5/00
[52] U.S. Cl. .............................. 119/52 B; 119/56 R; 222/529
[58] Field of Search ............. 119/52 AF, 52 B, 51.11, 119/56 R; 414/272, 526; 222/413, 626, 608, 529

[56] References Cited

U.S. PATENT DOCUMENTS

| | | | |
|---|---|---|---|
| 2,045,757 | 6/1936 | Constantin | 198/213 |
| 2,606,645 | 8/1952 | Heine | 198/64 |
| 2,782,903 | 2/1957 | Kennedy | 198/213 |
| 2,791,200 | 5/1957 | Palmer, Jr. | 119/52 B |
| 2,797,663 | 7/1957 | Bailey | 119/52 B |
| 3,322,257 | 5/1967 | Phillips | 198/119 |
| 3,550,812 | 12/1970 | Brown | 119/51.11 X |
| 3,587,529 | 6/1971 | Wienert et al. | 119/52 B X |
| 3,722,666 | 3/1973 | Ulm | 198/213 |
| 3,822,794 | 7/1974 | Fougea | 414/272 X |

Primary Examiner—Hugh R. Chamblee
Attorney, Agent, or Firm—Lowe, King, Price & Becker

[57] ABSTRACT

A poultry feeder apparatus comprises a feed hopper suspended on an overhead rail by motor driven trolley wheels. Feed in the hopper is gravity fed to a flexible auger hose at the lower end of the hopper. At the outlet of the auger hose, a handle is provided to enable the farmer to manually direct discharge of feed into floor mounted trays accessible to very young chicks. Electrical switches mounted on the handle control forward and reverse movement of the hopper on the rail as well as operate the discharge auger. Using the handle mounted switches, the farmer controls movement of the feed hopper along the overhead rail to follow him throughout the chicken house as he distributes charges of feed into the feed trays. The feeder apparatus may be used in non-automated chicken houses without alteration. Automated houses can be adapted to use the apparatus by disconnecting the standard, suspended feed receptacles to enable the hopper to pass freely through the house.

17 Claims, 8 Drawing Figures

U.S. Patent Sep. 23, 1980 Sheet 1 of 2 4,223,638
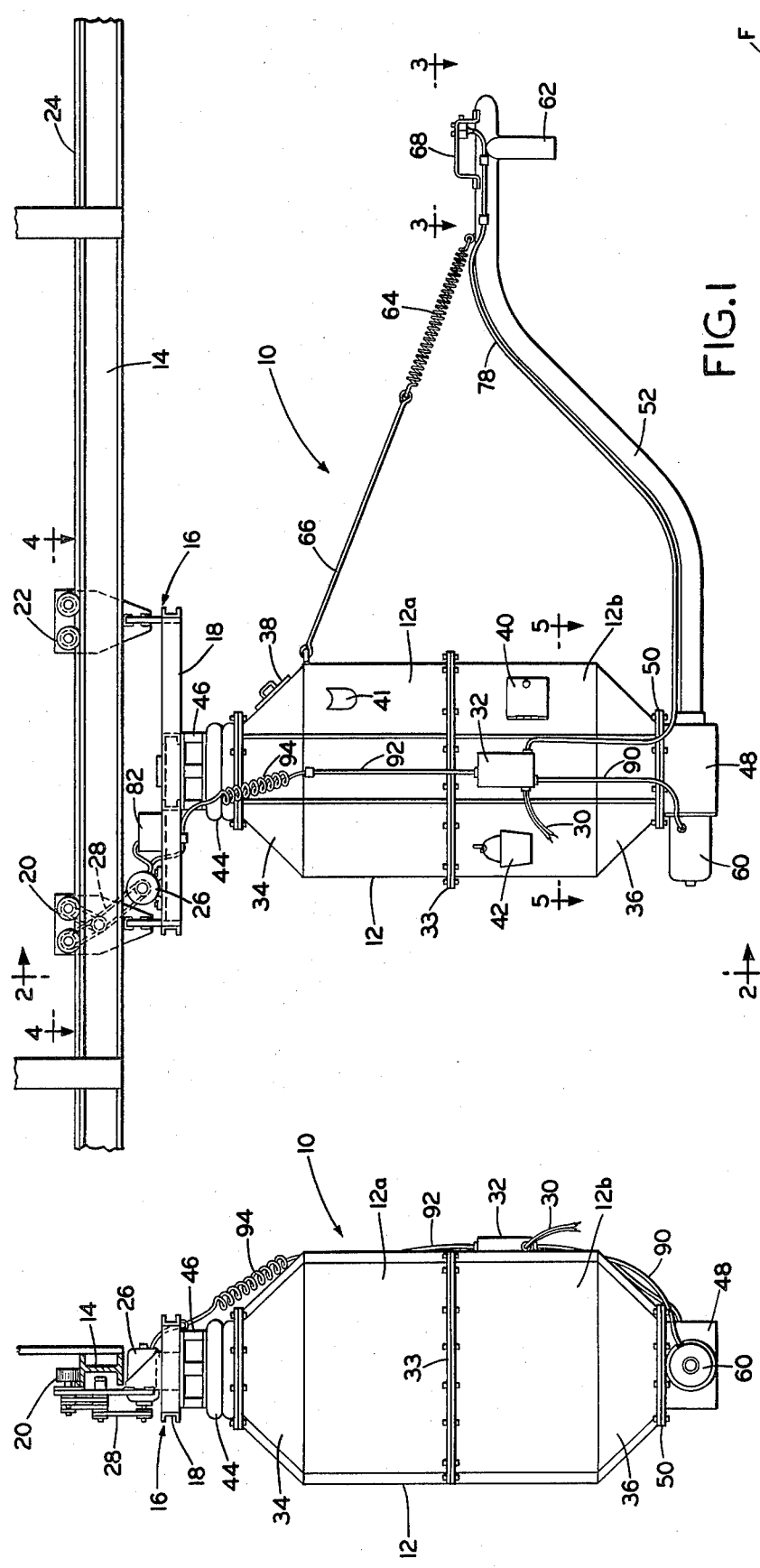
FIG. 1
FIG. 2
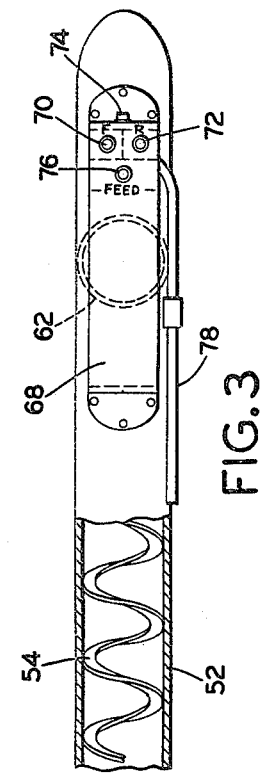
FIG. 3

APPARATUS FOR FEEDING POULTRY

TECHNICAL FIELD

The present invention relates generally to feeding apparatus, and more particularly, toward a hand controlled, mobile hopper driven on an overhead rail by an electric motor for transporting feed within a chicken house and distributing the feed to floor level feed trays for very young chicks.

BACKGROUND ART

Traditionally, chicken, or other poultry, have been fed by the farmer using a feed cart supported on an overhead rail to transport feed through the chicken house. The cart is manually rolled along the rail to feed stations throughout the house while feed is shoveled from the cart into floor level, flat feed trays for young chicks and into bowls for older poultry.

With the advent of automated chicken houses, the feed has been conveyed from a central hopper outside the house to feed receptacles distributed throughout the house. Very young chicks (within the first two week period in the house) cannot be fed by the automated feeder, however, because they are not tall enough to reach into the feed bowls to obtain the feed. Thus, even in automated houses, feeding of the very young chicks is still done manually.

The temperature in the poultry house is high (approximately 80° to 90° F.) during the initial two week period, and the feed cart, weighing over 1,200 pounds, is difficult to move on the overhead rail. It is thus apparent that the process of feeding chicks within the initial two week period in the house is physically very strenuous. This presents a particular problem for the aged who often raise poultry to provide a retirement income or for the infirm.

There is, therefore, a need for an apparatus to assist in the feeding of chicks in the initial two week period usable by individuals who ordinarily could not enter or continue to raise poultry due to physical limitations.

Accordingly, a broad object of the invention is to provide a new and improved apparatus for distribution of feed to poultry or livestock.

Another object is to provide an apparatus for feeding poultry which does not require any strenuous physical activity on the part of the poultry farmer.

Another object is to provide an apparatus for distributing feed from a central storage location to ground level feeding trays that are accessible by chicks within the first two week period in the chicken house.

Another object is to provide an apparatus for feeding young poultry, wherein a feed hopper suspended from an overhead rail is moved by an electric motor through a chicken house and the contents of the hopper are distributed through a hand controlled, motor driven auger hose to floor level feed trays.

Another object is to provide an apparatus for feeding young poultry, comprising an overhead, rail supported, electric motor driven hopper and an electric motor operated auger hose for delivering the contents of the hopper to floor level feed trays, wherein movement of the hopper on the rail as well as operation of the feed auger is manually controlled by electric switches at the auger hose outlet.

Another object is to provide a new and improved apparatus for feeding young poultry that is economical to manufacture and install in both automated and nonautomated chicken houses.

DISCLOSURE OF INVENTION

In accordance with the invention, a feed hopper is suspended from an open framework having a set of trolley wheels that ride on an overhead track or rail. One pair of trolley wheels is driven through a drive belt or chain by an electric drive motor mounted on the framework. Feed in the hopper is gravity fed to a screw conveyor in the form of a flexible auger hose at the bottom of the hopper. As the auger is rotated by a second electric drive motor, feed is pumped through the auger hose to an outlet held by the farmer through which feed is disbursed into standard, ground level feed trays for young chicks.

The outlet of the auger hose is supported at working level by a resilient cable and spring assembly connected between the hopper and auger outlet. The hopper itself is suspended from the overhead track by a swivel collar which enables the hopper to be rotated within a 180° angle for distribution of feed by the farmer throughout a region of the chicken house defined by the overhead track and the length of the auger hose.

The hopper drive motor is a bidirectional, variable speed, electric motor energized either by commercial, AC power or by a battery carried on the supporting framework. The auger motor is a unidirectional, single speed, AC/DC electric motor. The hopper drive motor and auger motor are selectively connected to the power source through switching relays mounted in a utility box on the wall of the hopper.

At the outlet of the auger hose, a handle enables the farmer to direct feed into the ground level feed trays. Of particular importance, normally open (N.O.) control switches for operating the motors as well as a control potentiometer for a hopper motor, variable speed control are mounted on the outlet handle and are connected through low voltage wiring to the motor control relays and speed control inside the utility box. The farmer is thereby able to control forward or reverse movement of the hopper on the overhead track as well as to control operation of the feed auger, all from the manually held, auger outlet. In practice, the farmer controls movement of the hopper on the overhead rail to follow him throughout the chicken house as he operates the auger hose to distribute feed into the feed trays. Because the electrical switches on the auger outlet are normally open, a fail-safe function is provided: the hopper motor as well as the auger drive will automatically become de-energized in the event that the farmer should drop or release the auger hose outlet during feeding.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 1 is a front view of an embodiment of a mobile feed hopper, in accordance with the present invention;

FIG. 2 is a side view of the hopper viewed long the line 2—2;

FIG. 3 is a detailed view of the auger hose and control handle with a portion of the hose removed to expose the feed auger;

BEST MODE FOR CARRYING OUT THE INVENTION

Figure 4:
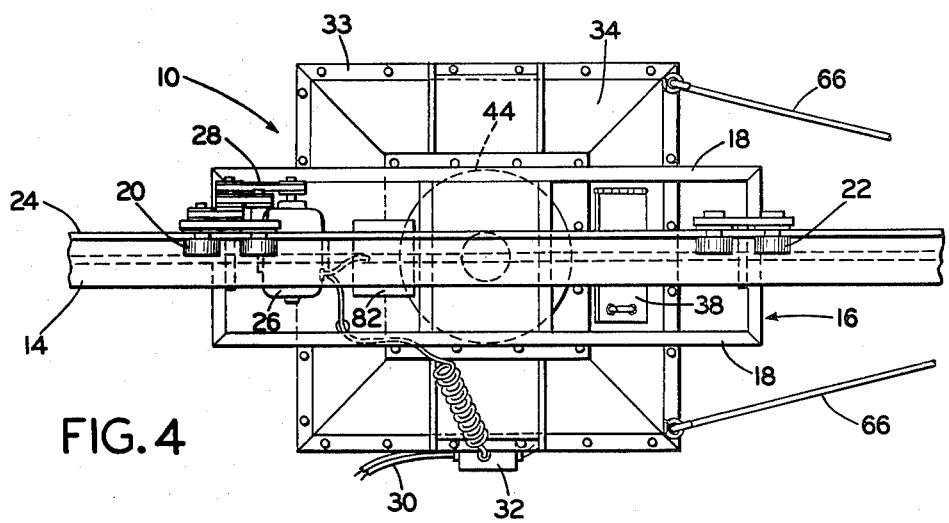
FIG. 4 is a top view of the hopper showing the supporting framework and trolley wheels.

Referring to FIGS. 1 and 2, a poultry feeder apparatus 10, in accordance with the invention, comprises a feed hopper 12 suspended from a standard overhead rail 14 by a trolley 16. The trolley 16 if formed of a horizontal, partially open frame 18 (see FIG. 4), supported at opposite ends thereof to the overhead rail 14 by pairs of trolley wheels 20 and 22, the wheels being retained on the rail by a rail lip 24. Rail 14 together with trolley 16 is existing equipment in most present day, automated and non-automated chicken houses with the rail being routed throughout the house for carrying the standard feed cart from which feed is shoveled to ground level feed trays, such as tray F (FIG. 7) for young chicks during their first two-week period in the house. Thus, in the automated house, the present invention can be installed on the existing rail without alteration to the house: the standard, fixed feeding trays (not shown) are disconnected from their supporting cables during the first two weeks of feeding while the present invention is being used.

In accordance with the present invention, the standard rail 14 and trolley 18 support hopper 12 and guide the hopper throughout the feed area of the chicken house by an electric motor 26 mounted at one end of rail 18 and coupled to trolley wheels 20 by pulleys or chains 28. The motor 26 is powered by the commercial AC power source over line 30 and through junction box 32 or, alternatively, by a battery 34 mounted adjacent the motor on frame 18.

The power line 30 may be mounted on a spring wound, take-up wheel (not shown) to provide an automatic rewind function. As another possibility, the line 30 may be connected to a conduit (not shown) on rail 14 for supplying electrical power to the drive motor 26 from a remote source while eliminating the need for electrical wiring along the floor of the chicken house. The motor 26 itself is preferably a universal, bidirectional motor rated at about ¼th horsepower and suitably geared down through the pulleys 28 to provide to hopper 12 an approximately three feet per second travel rate. Drive is coupled from motor 26 to trolley wheels 29 rather than to trolley wheels 22 because the weight of the motor 26 and battery 34 at that end of the trolley frame 18 increases frictional contact between the trolley wheels 20 and the upper surface of rail 14 to minimize slippage.

The hopper 12 is formed of two standard feed hoppers 12A and 12B, such as feed hoppers manufactured by Chore-Time Company, that are facing and bolted or welded at outwardly extending flanges 32 formed at the inlet of each hopper. It is to be understood, however, that the hopper 12 may alternatively be formed of a specially fabricated, integral unit to eliminate assembly of hopper sections 12A, 12B.

The hopper 12 has a substantially square, horizontal cross section (see FIG. 5) with inclined upper and lower end portions 34 and 36. A feeder gate 38 is provided in the upper, inclined end 34 of hopper 12 for supplying feed to the hopper from an overhead feed storage tank (not shown). A trouble door 40 is provided in the lower half 12B of hopper 12 to enable access to the interior of the hopper for servicing or for removing any objects that may have fallen within the hopper. A convenience receptacle 42 is also mounted on the hopper 12 for storing dead chicks or debris located by the farmer during feeding.

At the top of hopper 12, a swivel collar 44 having a ball bearing to enable the hopper to rotate about a vertical axis over at least a 180° angle is provided and attached to the trolley frame 16 by support bars 46. The swivel collar 44 allows the hopper 12 to be easily rotated by the farmer to access areas where feed is to be dispersed along the path defined by overhead rail 14.

Figure 5:
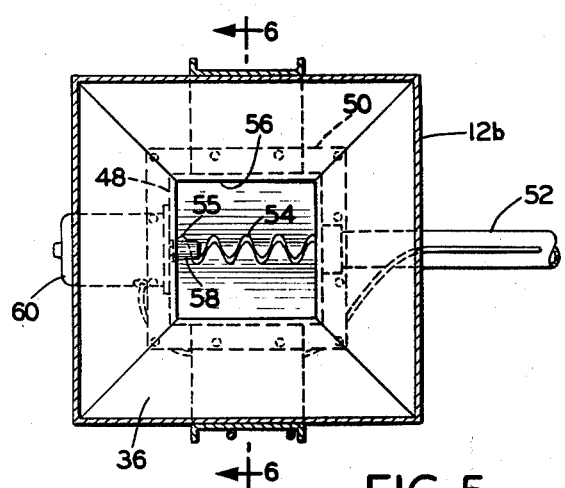
FIG. 5 is a view into the hopper taken along the line 5—5 in FIG. 1.
Figure 6:
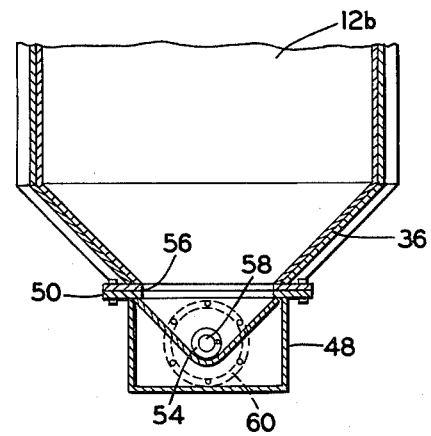
FIG. 6 is a cross sectional side view of a lower portion of the hopper taken along the line 6—6 in FIG. 5.

At the bottom of the hopper 12, a feed reservoir 48 is bolted to a mounting plate 50 (see also FIGS. 5 and 6). Extending through one side of the feed reservoir 48 is a standard, flexible auger hose 52 containing a coreless screw or auger 54 (FIG. 3). As shown in FIG. 5, the auger 54 extends beyond the hose 52 and is exposed to feed within the hopper at opening 56 in the bottom portion 36 of the hopper. End 55 of the auger 54 is coupled to the shaft 58 of a unidirectional, electric motor 60 having a rating of ¼ to ½ horsepower.

Figure 7:
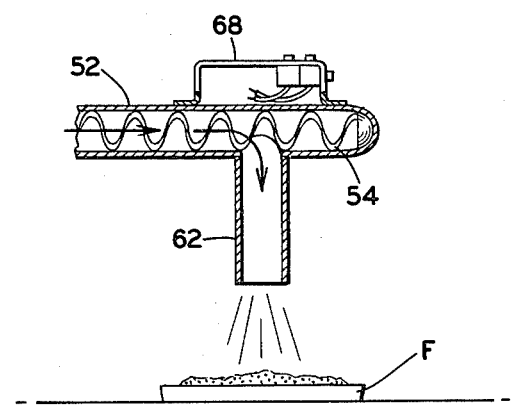
FIG. 7 shows discharge of feed from the auger hose outlet into a ground level feed tray.

The auger hose 52 extending outwardly from feed reservoir 48 has a feed outlet 62 through which the feed conveyed through the auger hose is dispersed to feeder trays F that are located at ground level. As shown in FIG. 7, the auger 54 extends beyond outlet 62 within auger hose 52 to prevent jamming of feed at the outlet.

Clearance between the bottom of reservoir 48 and the floor of the chicken house is about one foot. The working end of auger hose 52 is maintained above the clearance at about waist level by a helical spring 64 connected between the auger hose 52 and a pair of wire cables 66 (FIG. 5) extending upwardly to adjacent corners of the hopper 12. Thus, the outlet 62 has a tendency to float at about waist level of the farmer but can be easily lowered by him to floor level for distribution of feed into trays F. When not in use, the outlet 62 may be stored in a pocket 41 (FIG. 1) provided on hopper 12 from that purpose.

Of particular importance to the present invention, at the outlet 62 of auger hose 52, there is formed a handle 68 for enabling the farmer to manually position the outlet with respect to feed trays F. Referring to FIG. 3, the handle 68 supports a first electrical switch 70 for controlling forward movement of hopper 12 on rail 14, a second switch 72 for controlling reverse movement of the hopper, a variable control 74, such as a potentiometer, for controlling the forward and reverse speeds of the hopper and a third electrical switch 76 for controlling the operation of auger 54 for feed distribution. Alternatively, a momentary type three position toggle switch (not shown) may be used to provide the functions of switches 70 and 72, wherein the toggle is spring biased to return to a neutral, center position to de-energize the hopper motor when released. All electrical wiring between the control handle 68 and motors 26 and 60 is routed through a wiring conduit 78 provided along the outer surface of the auger hose 52 to the junction box 32. Each one of electrical switches 70, 72 and 76 is a normally open (N.O.), momentary push button electrical switch to provide a "dead man" safety function, that is, all movement of the hopper 12 on rail 14 or turning of auger 54 is terminated automatically in the event that the farmer loses his grip on or releases the control handle 68 during feeding.

Figure 8:
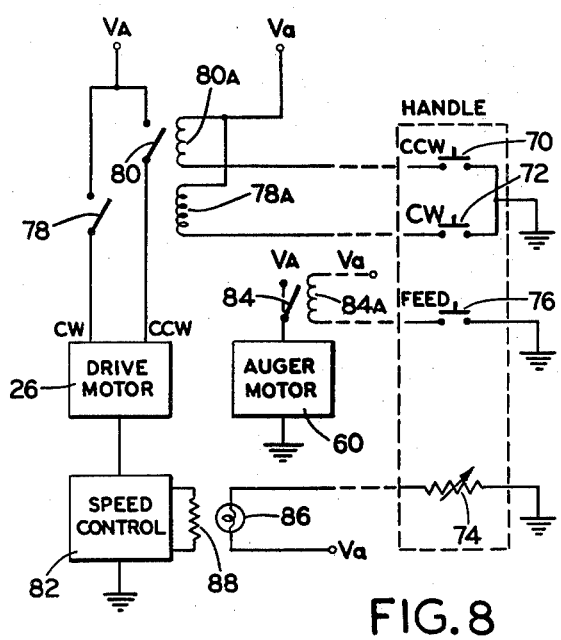
FIG. 8 is a circuit diagram showing exemplary switching and control circuitry for the invention.

Referring to FIG. 8, drive motor 26, which is represented schematically, contains the standard clockwise and counterclockwise running coils (not shown) which are connected, respectively, to a source of voltage $V_A$ through relay N.O. contacts 78 and 80. Drive motor 26 is also connected to ground through a speed control 82, which may be of the conventional phase control type. Source $V_A$ may be provided directly by the commercial AC line. The AC voltage generated by source $V_A$ may be processed through rectification and filtering circuitry (not shown) to one half or full wave rectified AC or filtered DC current, depending upon particular motor specifications. Alternatively, the source $V_A$ may be provided by battery 34 (FIG. 1) maintained charged by the AC power line and used either for full time or standby supply of power.

Relay coils 78A and 80A for operating contacts 78, 80 are connected between a voltage source $V_a$ and ground through push button switches 70 and 72 mounted on control handle 68. The voltage source $V_a$ is a low voltage source, such as 12 volts DC or AC, to which the coils 78A and 80A are rated to respond. Since relay contacts 78 and 80 as well as push buttons 70 and 72 are normally open (N.O.), when switch 70 is manually closed, coil 78A is energized by voltage source $V_a$ which causes relay contacts 78 to close connecting the clockwise running coil of drive motor 26 between voltage source $V_A$ and ground through speed control 82. On the other hand, when push button switch 72 is closed, relay coil 80A is energized by voltage source $V_a$ which causes relay contacts 80 to close connecting the counterclockwise running coil drive motor 26 between source $V_A$ and ground through the speed control 82. Mechanical coupling (not shown) may be provided between the two switches 70 and 72 to prevent both switches from being depressed simultaneously which would improperly energize both the counterclockwise and clockwise running coils of motor 26. This is not required, however, where a momentary toggle switch is used in place of switches 70 and 72 as mentioned above.

Speed control 82 is controlled by potentiometer 72 also mounted on the handle of 68. The potentiometer 72 is connected between low voltage source $V_a$ and ground through a lamp or LED 86 which is optically coupled to a light responsive resistor 88 in the speed control 82. Rotation of the potentiometer 74 controls the amount of current passing through lamp 86 and therefore its intensity which is sensed by the light responsive resistor 88 to control the power phase angle and therefore the speed of drive motor 26, in a conventional manner.

Auger motor 60 is connected between high voltage source $V_A$ and ground through relay contacts 84. The relay contacts 84 are controlled by corresponding relay coil 84A which is selectively connected between low voltage source $V_a$ and ground through (N.O.) push button switch 76. The auger motor 60 is thereby energized whenever push button switch 76 at control handle 68 is depressed by the farmer. Upon release of the switch 76, rotation of the auger 54 and dispersion of feed are terminated.

Thus, the control elements, comprising push button switches 70, 72 and 76 as well as potentiometer 74, are electrically or optically isolated from the power switching circuitry for controlling drive motor 26 and auger motor 60. For additional safety, the relays 78 and 80 as well as speed control 82 are located within junction box 32 (FIG. 1). Wiring between the junction box 32 and auger motor 60 is located within a conduit 90 whereas wiring between junction box and drive motor 26 is located within conduit 92, with the remainder of the wiring being coiled at 94 outside the conduit to allow slack with rotation of the hopper 12 at bearing collar 44.

In use, hopper 12 is initially loaded from the overhead bin (not shown) through loading gate 38. The farmer then removes the outlet 62 of auger hose 52 from pocket 41 on the side of the hopper 12. The speed of the hopper drive is adjusted by the calibrated control 74 on the handle 68, and this setting is generally maintained by the farmer, although it would in practice be adjusted by others using the feeder, such as a younger helper who might prefer to operate the feeder at a higher speed. With the handle 68 maintained at waist height, the forward button 70 is depressed by the farmer causing the drive motor 26 to transport the hopper along the overhead rail 14 into proximity of the feeder trays F. As the farmer approaches each tray F, he will release the forward button 70 to stop forward movement of the hopper 12 and then depress feed switch 76 as the outlet 62 is positioned over the feed tray F (see FIG. 7).

After a charge of feed has been dispersed to the feed tray F, the farmer releases the feed button 76. He now supplies additional charges of feed to other feed trays F within the range of the auger hose 52. As needed, the farmer adjusts the position of the hopper on rail 14 by selectively operating the forward and reverse drive buttons 70 and 72. After all feed trays in the immediate vicinity of the hopper are filled, the farmer depresses the forward button and walks the hopper to the next convenient stopping point to fill several feed trays F. Following feeding, the hopper 12 is controlled to return to a storage location, and the outlet 62 is returned to pocket 41.

It has thus been shown that the present invention eliminates any physically vigorous activity on the part of the farmer since transportation of the feed throughout the chicken house as well as dispersion of feed into individual, ground level trays has been provided by the apparatus 12 under manual control of the farmer. The speed of the hopper 12 on rail 14 can be reduced by speed control 74 on the control handle 68 to accommodate the physical condition of each particular farmer or his assistants. It should be apparent that, although the apparatus 10 was originally designed for use in an automated chicken house for feeding baby chicks during their first two week period in the house (the chicks are generally fed by a conventional automatic feeder during their remaining stay), the apparatus may also be used in a non-automated house by simply utilizing the existing overhead steel rail 14 in all houses. The apparatus may further be used during the entire period in the nonautomated house and may, in some circumstances, eliminate the need for installing more sophisticated and expensive, fully automatic equipment.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. A poultry feeding apparatus, comprising:
   a feed hopper having wheel means for supporting said hopper on a track;
   first motor means coupled to said wheel means for moving said hopper on said track;
   screw conveyor means for conveying feed from said hopper to feed trays positioned outside said hopper in a feeding region, a handle being formed at an outlet of said screw conveyor means to enable manual positioning of said conveyer means outlet over said feed trays;
   second motor means for rotating said screw conveyor means; and
   electrical switch means positioned at said outlet handle for selectively connecting said first and second motor means to a source of electrical power to control movement of said feed hopper on said track as well as discharge of feed from said outlet.

2. The feeding apparatus of claim 1, wherein said switch means comprises at least one momentary type, electrical switch.

3. The feeding apparatus of claim 1, wherein said hopper includes swivel collar means for rotation of said hopper about a vertical axis to enable said conveyer screw outlet to be operated in an angle of at least 180°.

4. The feeding apparatus of claim 1, including pulley means interconnecting said first motor means and said wheel means.

5. The feeding apparatus of claim 1, wherein said switch means are electrically isolated from said power source.

6. The feeding apparatus of claim 1, including relay means mounted on said hopper and responsive to said switch means for selectively connecting said first and second motor means to said power source, and a low voltage control circuit interconnecting said switch means and said relay means.

7. The feeding apparatus of claim 2, wherein said switch means includes means for controlling bidirectional rotation of said first motor means.

8. The feeding apparatus of claim 1, wherein said first motor means comprises a bidirectional electric motor and said second motor means comprises a unidirectional electric motor.

9. The feeding apparatus of claim 8, including means for controlling the speed of said first electric motor.

10. The feeding apparatus of claim 9, wherein said speed control means includes a manually operated control member mounted on said handle.

11. The feeding apparatus of claim 1, wherein said screw conveyer means comprises a flexible auger hose.

12. The feeding apparatus of claim 11, including a resilient support member interconnecting a portion of the screw conveyer adjacent said outlet and an upper portion of said hopper to maintain the outlet at a working height.

13. The feeding apparatus of claim 1, wherein said track is an overhead track.

14. The feeding apparatus of claim 13, including a frame carrying said wheel means and from which said hopper is suspended, said wheel means including first and second sets of trolley wheels located respectively at opposite sides of said hopper, said first motor means being mounted to said frame adjacent said first set of wheels and being coupled to drive said first set of wheels, the weight of said first motor increasing frictional contact between said first set of trolley wheels and said rail.

15. The feeding apparatus of claim 1, including speed control means for controlling the speed of said first motor means.

16. The feeding apparatus of claim 15, wherein said speed control means includes a variable element mounted on said handle.

17. The feeding apparatus of claim 16, including means for electrically isolating said variable element from said power source.

* * * * *